(No Model.)
J. F. WELCH.
FLOORING GAGE.
No. 465,121. Patented Dec. 15, 1891.
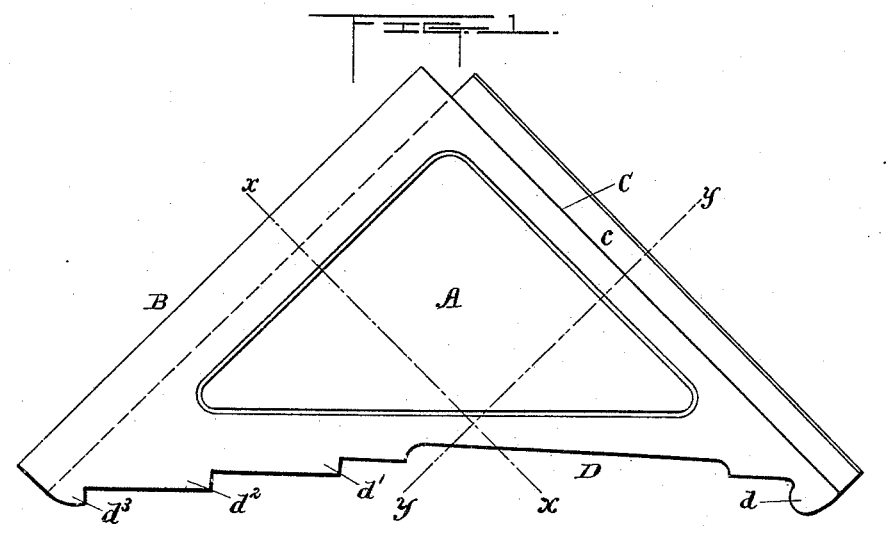
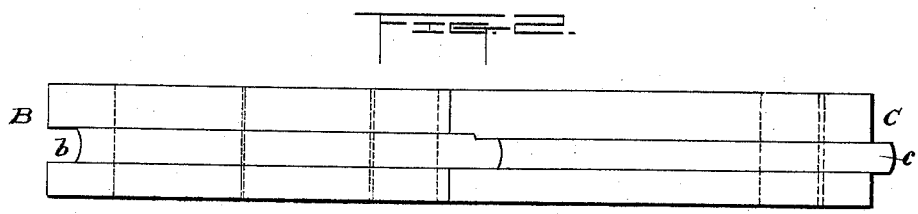
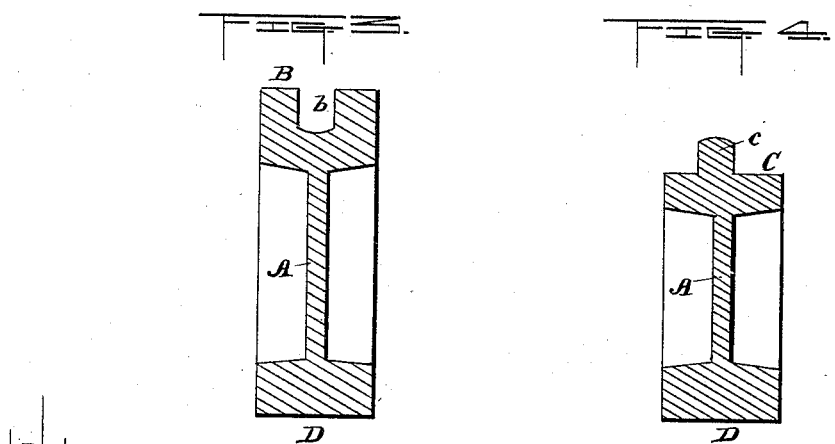
Witnesses:
R. B. Seward
D. H. Hayford
Inventor
James F. Welch
By Brown & Seward
his Attys

UNITED STATES PATENT OFFICE.

JAMES F. WELCH, OF BROOKLYN, NEW YORK, ASSIGNOR TO THE GLEN COVE MACHINE COMPANY, LIMITED, OF SAME PLACE.

FLOORING-GAGE.

SPECIFICATION forming part of Letters Patent No. 465,121, dated December 15, 1891.

Application filed July 9, 1891. Serial No. 398,878. (No model.)

*To all whom it may concern:*

Be it known that I, JAMES F. WELCH, of Brooklyn, in the county of Kings and State of New York, have invented a new and useful Improvement in Flooring-Gages, of which the following is a specification.

My invention relates to an improvement in flooring-gages in which the means for determining the proper depth of groove, height of tongue, and width of board are assembled in a single instrument so as to be applied to the board at pleasure.

In the manufacture of flooring it is important that the matching of the boards should be done with great precision, and that the widths of the boards themselves should be uniform; and to this end the operator has heretofore commonly employed an ordinary piece of tongue-and-groove board or a rule, or both. Aside from the liability of these separate guides becoming misplaced, the piece of board has been liable to become worn so as to fail to indicate with exactness the depths and heights of the groove and tongue, while the measurement of the width by a rule laid on the board requires time and great care to determine with exactness the true width.

The object of my present invention is to overcome the objections of the means hitherto employed and to provide a single instrument well adapted to the purpose.

A practical embodiment of my invention is represented in the accompanying drawings, in which—

Figure 1 is a view of the gage in side elevation. Fig. 2 is a top plan view. Fig. 3 is a transverse section through line $x$ $x$ of Fig. 1, and Fig. 4 is a transverse section through line $y$ $y$ of Fig. 1.

The general form of the instrument is triangular, its edges being formed of a thickness preferably corresponding to the thickness of the lumber to be measured and its central portion A consisting of a thin web connecting the three thick edges. The material employed is preferably some suitable metal and the instrument cast into shape. The edge B is provided with a groove $b$, which is intended to be of such depth and width as to correspond with the desired height and width of the tongue to be formed upon the lumber. The edge C is provided with a tongue $c$, the height and thickness of which are intended to correspond with the depth and thickness of the groove to be formed in the edge of the board. The side D is provided with an abutment $d$ at or near one end and with a series of steps $d'$ $d^2$ $d^3$ at the opposite end, each of which is intended to form, together with the step or shoulder $d$, a pair of abutments, the distance between which shall measure the exact width of the board to be provided with the tongue and groove. In the present instance the widths between the abutment $d$ and the abutments or steps $d'$ $d^2$ $d^3$ correspond to a width of three and one-half, four and one-half, and five and one-half inches, respectively.

In use the operator, as the lumber is run through the machine, may grasp the instrument and apply to its tongue side the grooved side of the instrument or to the groove side the tongue side of the instrument or to its width that side of the instrument which determines the widths of the material. In fact, he may apply the instrument in all three of the above-entitled ways within a moment's space of time, and so adjust the machine, if there is found to be any variance between the dimensions desired and those being produced, as to overcome the difficulty. The instrument is, furthermore, a convenient one to handle and may be kept within easy reach.

What I claim is—

1. The herein-described gage, comprising a part having a tongue for determining the depth of the groove, a part having a recess for determining the height of the tongue, and a graduated part for determining the width of the board, the several named parts occupying the different sides or edges of an instrument, substantially as set forth.

2. The herein-described gage, comprising a triangular piece having two of its edges set at right angles to each other, one of them being provided with a tongue and the other with a groove, and its third side being provided with two or more abutments for determining the width of the flooring to be operated upon, substantially as set forth.

JAMES F. WELCH.

Witnesses:
FREDK. HAYNES,
D. H. HAYWOOD.